United States Patent
Bachelder et al.

(10) Patent No.: US 9,670,947 B2
(45) Date of Patent: Jun. 6, 2017

(54) TRIM RETAINER-STAB CLIP

(71) Applicant: Magna International Inc., Aurora (CA)

(72) Inventors: Theodore J. Bachelder, Vanderbilt, MI (US); Ronald J. Andor, East Jordan, MI (US); Molli J. Andor, East Jordan, MI (US); Michael S. Gignilliat, Traverse City, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 14/937,455

(22) Filed: Nov. 10, 2015

(65) Prior Publication Data

US 2016/0129854 A1    May 12, 2016

Related U.S. Application Data

(60) Provisional application No. 62/077,445, filed on Nov. 10, 2014.

(51) Int. Cl.
*F16B 5/06* (2006.01)
*F16B 21/08* (2006.01)
*B60R 13/02* (2006.01)

(52) U.S. Cl.
CPC ........ *F16B 5/0628* (2013.01); *B60R 13/0206* (2013.01); *F16B 5/0657* (2013.01); *F16B 21/08* (2013.01)

(58) Field of Classification Search
CPC ... B60R 13/02; B60R 13/0206; F16B 5/0628; F16B 5/0657; F16B 21/08
USPC .... 24/317, 581.11, 297, 620, 621, 614, 615, 24/625, 316, 574.1, 587.11
See application file for complete search history.

(56) References Cited

U.S. PATENT DOCUMENTS

| | | | | |
|---|---|---|---|---|
| 6,052,875 A | * | 4/2000 | Fudaki | A44B 11/266 24/615 |
| 6,163,942 A | * | 12/2000 | Liao | A44B 11/266 24/591.1 |
| 7,165,371 B2 | * | 1/2007 | Yoyasu | B60R 13/04 24/292 |

* cited by examiner

*Primary Examiner* — Abigail Morrell
(74) *Attorney, Agent, or Firm* — Warn Partners, P.C.

(57) ABSTRACT

A trim retainer assembly having a clip portion with a base and a molded housing having a keyhole and an opening. The keyhole in the doghouse is smooth for improved molding and elimination of tuning since there are no detents in the bore to tune or maintain. The base is provided with a pair of arms that are flexible and each arm having a self detent feature that passes through the opening in the housing to provide clip retention and, at the same time, float for tolerance variations is provided. The pair of arms also include nominal centering detents. The keyhole bore, opening, and clip portion provides clip detent, consistent retention effort, float, centering and anti-rotation.

13 Claims, 3 Drawing Sheets

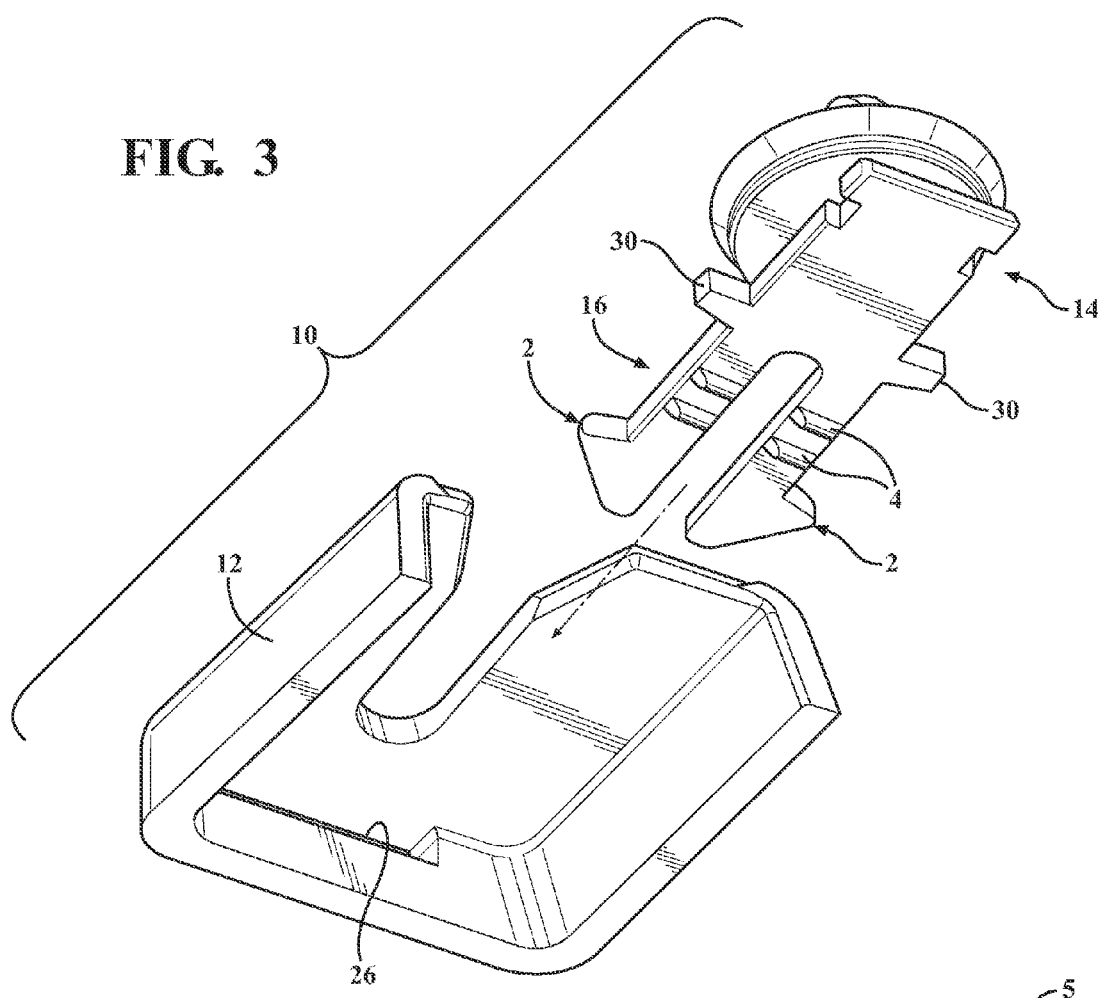
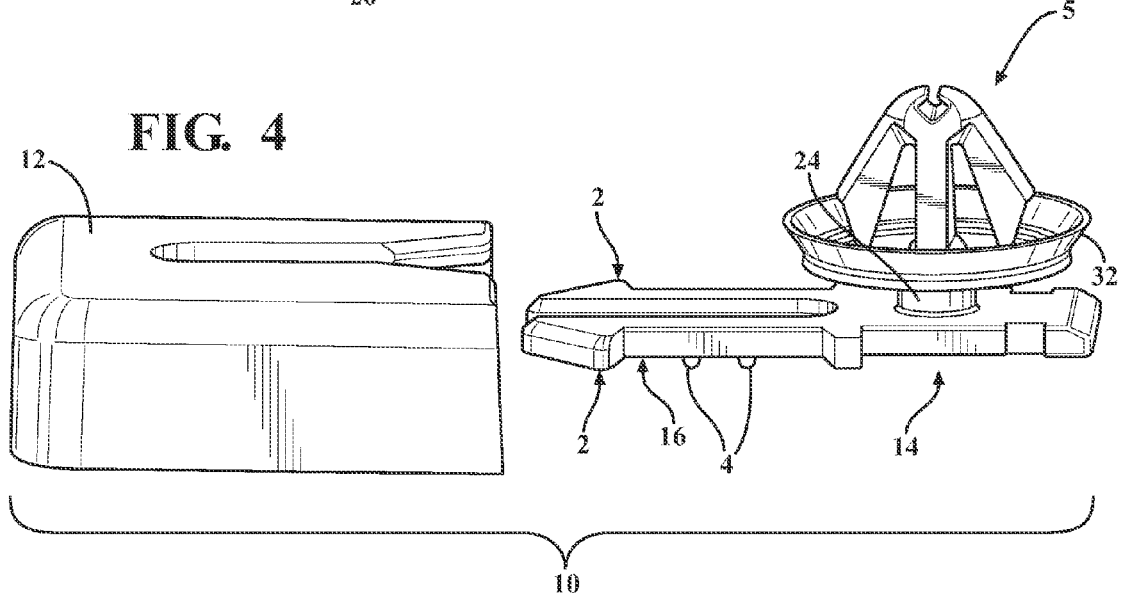

TRIM RETAINER-STAB CLIP

CROSS-REFERENCE TO RELATED APPLICATIONS

This application claims the benefit of U.S. Provisional Application No. 62/077,445, filed Nov. 10, 2014. The disclosure of the above application is incorporated herein by reference.

FIELD OF THE INVENTION

The present invention relates to a clip assembly with detent, float and retention features for use in automotive trim attachment applications.

BACKGROUND OF THE INVENTION

Plastic molded clips generally are used in automotive trim panels to provide the attachment of the trim pieces or panels to the support structure of the vehicle. Known clips typically have a built-in means of detent to provide retention, however, the clips do not provide a simultaneous means for "float" tolerance variation. The trim panels have housings known as "doghouses" provided with clip keyholes to receive and retain the clip. There is poor clip retention in the molded clip positions (within the doghouses) having retainer detents (clip keyholes). This is particularly a problem with molded thermoplastic polyolefin (TPO) material products. Another issue is the excessive time spent on tool repair and maintenance attempting to achieve acceptable clip retention. Ongoing tuning of the keyhole opening is quite often required. There is tool wear due to repeated tuning of the keyhole opening. There are also inconsistent clip retention values and inconsistent insertion efforts. These all further lead to lost productivity and increased expense in labor, tooling, materials, maintenance repair, and etc.

Most trim applications require a clip anti-rotation feature and "float" in the clip. However, current products cause complications to the lifter details to provide anti-rotation and "float". "Float" being generally defined as a means for the assembly to absorb tolerance variation due to the coefficient of linear thermal expansion (CLTE), of the moldable material and/or product, and manufacturing tolerances.

Accordingly, there is a desire for a trim retainer assembly that provides consistence performance in terms of insertion and retention efforts, relative to conventional clips, built-in anti-rotation of the clip, provide "float" in the clip for build tolerances, provide a clip centering means for nominal tolerances, and a simplified standard housing/doghouse, while also reducing or eliminating tuning and repairs of the mold as in the case of conventional molded keyholes.

SUMMARY OF THE INVENTION

The present invention is directed to a trim retainer assembly having a clip portion with a base and a molded housing (or "doghouse"), having at least one keyhole. The bore of the molded keyhole in the doghouse is smooth for improved molding and elimination of tuning since there are no detents in the bore to tune or maintain. The base is provided with a pair of flexible arms (or "stab arms") with self detent features that pass through an opening in the doghouse to provide clip retention and, at the same time, "float". The pair of flexible arms also have clip centering detents. The housing with the keyhole bore in combination with the clip portion with the pair of arms provides the superior combination of operable clip detent, retention effort, consistent insertion/extraction, float, centering and anti-rotation, and simplification of tooling. The clip platform is also adaptable to any different styles/setup heights of molded clips.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded view of the trim retainer assembly of FIG. 2 viewed from the bottom, in accordance with the present invention;

FIG. 4 is an exploded view of the trim retainer assembly of FIG. 2 viewed from the side, in accordance with the present invention.

DETAILED DESCRIPTION OF THE PREFERRED EMBODIMENTS

Figure 1:
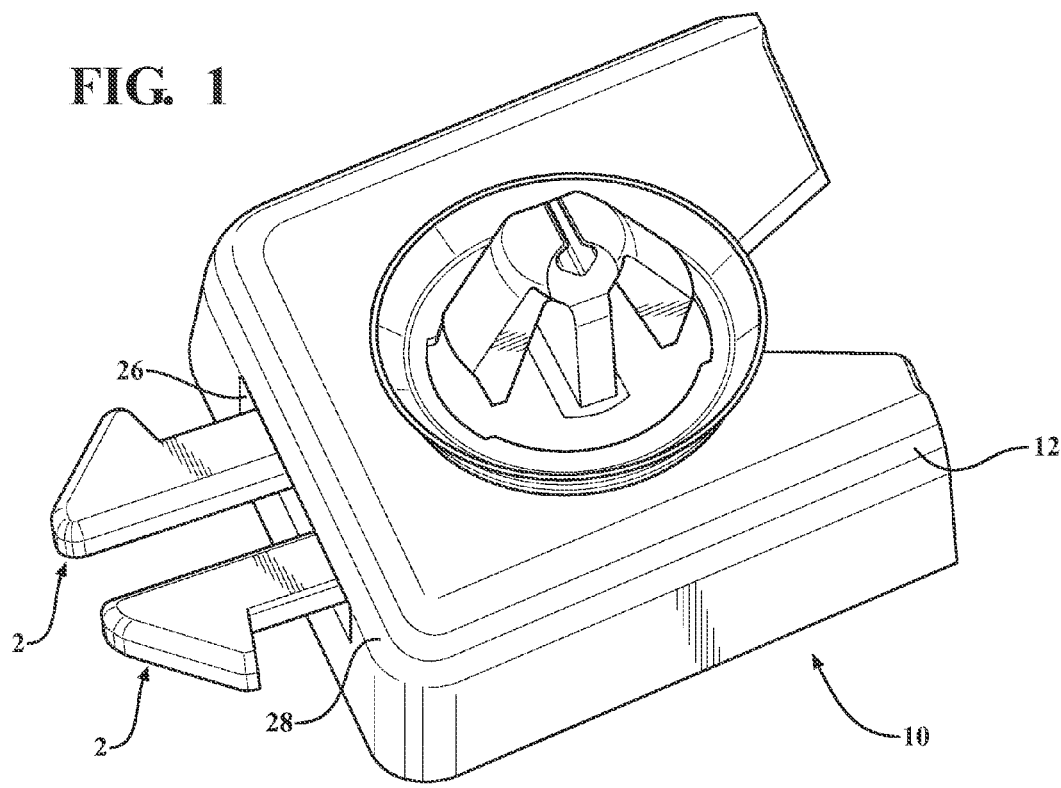
FIG. 1 is a perspective view of a trim retainer assembly, in accordance with the present invention.

The following description of the preferred embodiment(s) is merely exemplary in nature and is in no way intended to limit the invention, its application, or uses.

In general, the trim retention assembly of the present invention provides a clip platform that exhibits substantially consistent performance in terms of predetermined insertion and retention efforts. The clip platform is also adaptable to many different styles/setup heights of molded clips. In accordance with the present invention, it is achievable to eliminate tuning and repairs of the mold as in the case of conventional molded keyholes. There is also provided a simplified design of doghouses; the design of the doghouse is preferably standard. The present invention provides a built-in anti-rotation of the clip, as well as "float" in the clip for build tolerances and a clip centering means for nominal position. The detent features in combination with the free floating feature for tolerance variations have significant benefits and superior results over built in detent alone.

Referring to FIGS. 1-4 generally, there is provided a trim retention assembly, shown generally at 10, having a doghouse 12, and having a clip portion, shown generally at 5, operable for automotive trim attachment. The clip portion 5 has a base shown generally at 14 with a flexible portion shown generally at 16 that has at least one pair of stab arms 1. The pair of flexible arms 1 are generally parallel to one another and spaced a predetermined operable distance apart. Each flexible arm 1 includes a terminal feature, which provides a self detent feature shown generally at 2 formed by the terminal ends of the pair of flexible arms 1.

According to the present invention, unlike conventional doghouses, the bore of the molded keyhole shown generally at 18 of the doghouse 12 is entirely smooth, and has no detents to tune or maintain. The bore keyhole 18 has an open entry portion 20, most preferably a wider portion 20 that is open ended and has angled walls at a predetermined angle funneling toward a retention portion 22, preferably, a narrower elongated portion 22, for receiving at least a neck area 24 of the clip portion 5.

The doghouse 12 also has at least one opening 26 that is a detent pass-through opening. When the pair of flexible arms 1 are selectively passed through and held relative to the opening 26, the neck area 24 of the clip portion is held in the retention portion 22 of the bore 18.

The opening 26 is located in one end of the doghouse, preferably, an outward surface 28 or bottom surface of the doghouse 12. The opening has a predetermined shape and dimensions operable for receiving the detent features of the stab arms 1. Preferably, the opening 26 is a slot. The opening 26 can be any other suitably sized opening(s) for receiving the flexible arms 1,1 depending on the particular application without departing from the scope of the present invention.

The clip portion 5 also has a larger diameter portion 32 adjacent a winged portion and spaced a predetermined operable distance from the base 14. Depending on the application the clip is a nylon plastic clip, e.g., winged nylon plastic clip. In operation, the neck 24 of the clip portion 5 is operably aligned to the bore keyhole 18 and as the clip portion 5 moves in the direction of clip load, as indicated by the arrow in FIGS. 2-3, laterally through the entry portion 20 and toward the retention portion 22, the neck area 24 is within the bore 18 while the larger diameter portion 32 is on the outside of the doghouse 12. As the clip portion 5 advances further along the retention portion 22 of the bore 18, the pair of stab arms 1 pass through the opening 26 of the doghouse 12 until at least both self detent features 2 pass through the opening 26 to provide clip retention and at the same time four-way "float" to accommodate tolerances in the attachment of the trim piece.

Figure 5:
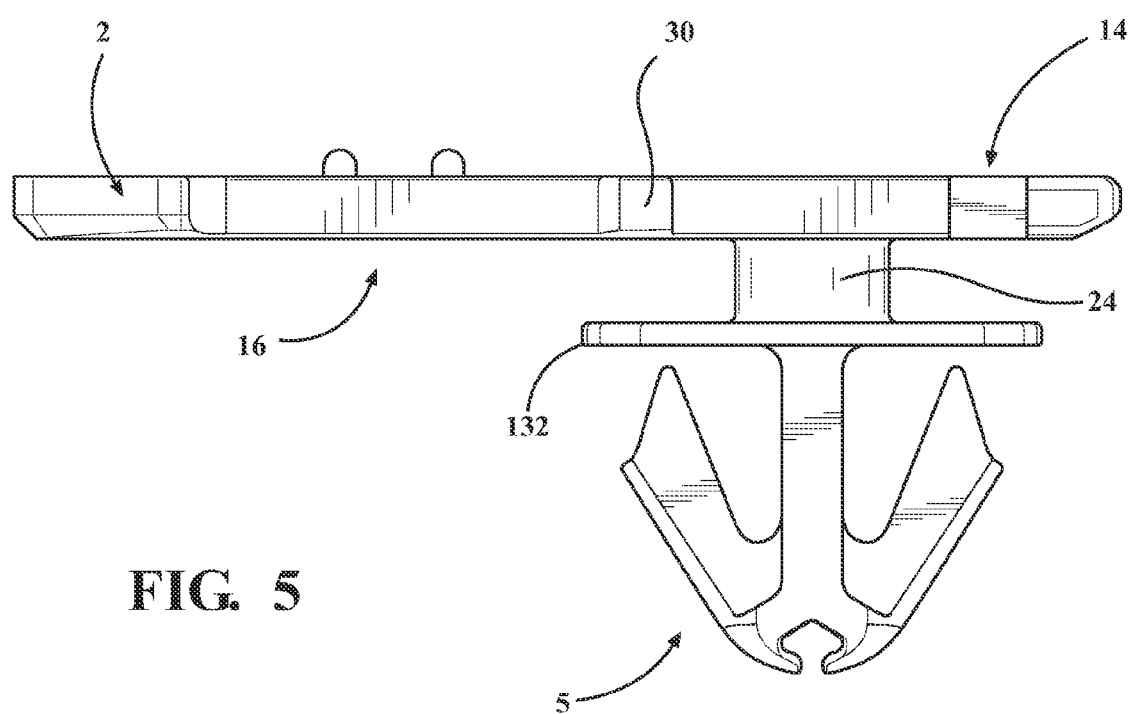
FIG. 5 is a side elevation view of a clip portion for the trim retainer assembly, according to an embodiment of the present invention.

The larger diameter portion 32 is spaced a predetermined distance from the base 14 operable for the neck portion 24 to slide into the keyhole 18. The larger diameter portion 32 has a coupled saucer-like shape, however, it is within the scope of this invention that the larger diameter portion 32 is alternatively shaped depending on the application. In a preferred embodiment, depicted in FIG. 5 wherein like numbers indicate like parts, the larger diameter portion 132 has a washer-like profile, most preferably, flat round washer shape.

The self detent features 2 are ramped outward for passing through the opening 26, e.g., by pushing against the sides of the opening in the area of the ramps to cause the stab arms to push toward one another so that the detents can pass through the opening 26. Once the detents 2 pass through the opening the stab arms 1 automatically return to their outward resting position. The pair of flexible arms 1 provide a predetermined amount of flexibility such that the stab arms can pass through the opening 26 and also can be selectively squeezed toward one another for backing the self detent features 2 back out of the opening 26 against the direction of clip load if desired.

Figure 2:
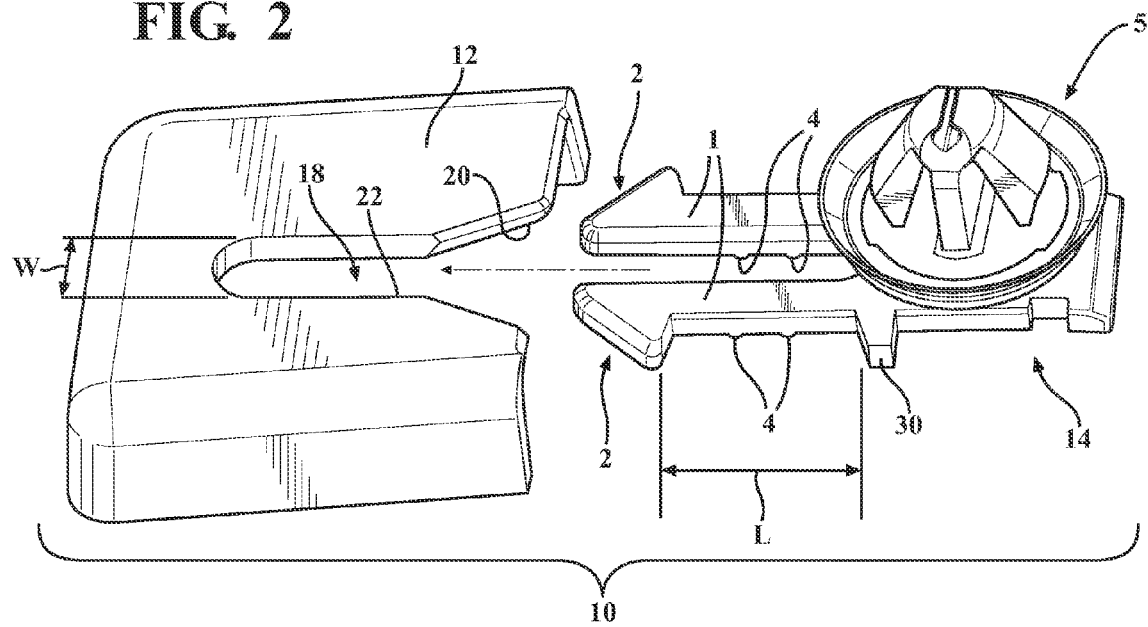
FIG. 2 is an exploded view of the trim retainer assembly of FIG. 1 viewed from the top perspective and depicting the direction of clip load of a clip portion relative to a doghouse, in accordance with the present invention.

Located on the pair of stab arms 1 are a series of clip centering detents 4, e.g., rounded protrusions or ribs. Most preferably, two adjacent nominal centering detents 4 on each arm are located transverse to the longitudinal axis of the arm. An operable predetermined amount of clip "free play" is provided on each side of the clip centering detents 4. FIG. 2 illustrates an exemplary clip freeplay length, "L", generally in the area between the self detent feature 2 and a protruding stop 30 on both arms. The clip freeplay length is adjusted dependent upon particular applications without departing from the scope of the present invention.

The bore of the molded keyhole 18 in the doghouse 12 is smooth, therefore, there are no detents to tune or maintain. The smooth bore keyhole 18 can also be pulled with the same lifter as inside the doghouse. The smooth bore is formed on standing steel in the core and wear that affects the size of the bore is minimized thereby yielding consistent size from mold run to mold run. The smooth bore keyhole 18 also has a predetermined width "W" adjustable to provide 4-way float dependent upon particular applications. The clip portion 5 is variable design application dependent. The clip portion's 5 base 14 provides a means of detent when passed through the opening 26 of the doghouse 12, which is also easily maintained for size and provides consistent detent/retention efforts. The keyhole bore 18 design along with the pair of stab arms 1 of the clip base 14 provides a superior combination of clip detent, float, centering and anti-rotation.

The trim retention assembly 10 of the present invention provides for consistent insertion, consistent extraction, clip anti-rotation, and simplifies the tooling required to mold the plastic trim piece. Further, the present invention provides cost savings due to tool maintenance reduction, tuning elimination and critical fit tool repair simplification.

The plastic clip portion 5 and/or doghouse is/are preferably molded thermoplastic, most preferably, molded thermoplastic polyolefin (TPO).

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A trim retention assembly, comprising:
a housing having an opening;
a clip portion having a base with a flexible portion insertable in a longitudinal clip load direction of a longitudinal axis into the opening;
at least one self detent feature located at a leading terminal end of the flexible portion to insert the flexible portion through the opening in the housing and to keep the flexible portion within the opening;
at least one protruding stop located on the base a predetermined distance from the at least one self detent feature, wherein the distance between the at least one self detent feature and the at least one protruding stop provides a length of allowed movement of the flexible portion, while within the opening, with respect to the longitudinal axis to accommodate tolerance variations;
an aperture located on the housing;
a neck area formed on the clip portion transverse to the longitudinal axis of the flexible portion, wherein the neck area of the clip portion is slidable within the aperture while the flexible portion is moving longitudinally within the opening; and
at least one centering detent formed in the base to center the clip portion.

2. The trim retention assembly of claim 1, wherein the aperture includes a bore that is smooth.

3. The trim retention assembly of claim 2, wherein the bore has a predetermined width wider in relation to the neck area to provide the neck area with side to side movement within the bore to accommodate tolerance variations when the flexible portion is within the opening.

4. The trim retention assembly of claim 1, wherein the neck portion is coupled to a larger diameter portion that is located outside the aperture when the base is located inside the housing.

5. The trim retention assembly of claim 1, wherein the at least one self detent feature is a pair of self detent features, wherein the flexible portion is a pair of flexible arms, each having one of the self detent features, and the opening is a detent-pass through opening to receive the self detent features of the pair of flexible arms.

6. The trim retention assembly of claim 5, wherein the at least one centering detent is a pair of centering detents protruding from each flexible arm.

7. A trim retention arrangement, comprising:
a housing having an opening and an aperture with a smooth bore;
a clip portion having a base with a flexible portion, wherein the flexible portion has a pair of flexible arms;
a self detent feature formed at a leading terminal end of each flexible arm to compress the pair of flexible arms inward for passing the pair of flexible arms into the opening in the housing and to keep the pair of flexible arms within the opening;
a protruding stop formed on each side of the base at a distance away from the self detent features to allow the pair of flexible arms to slide back and forth within the opening, with respect to a longitudinal axis, with the amount of back and forth that is allowable being the length of the distance between the self detent feature and the protruding stop to absorb tolerances;
a neck portion formed on the clip portion transverse to the longitudinal axis, wherein the neck portion slides within the aperture when the pair of flexible arms slide within the opening;
wherein the bore has a predetermined width wider than the neck portion to provide side to side movement of the neck portion within the bore to absorb tolerances when the pair of flexible arms are within the opening.

8. The trim retention assembly of claim 7, wherein the flexible arms are arranged parallel to one another.

9. The trim retention assembly of claim 7, further comprising adjacent centering detents formed on the pair of flexible arms.

10. The trim retention assembly of claim 9, wherein the adjacent centering detents are a pair of centering detent spaced a predetermined distance apart and located transverse to the longitudinal axis of each flexible arm.

11. The trim retention assembly of claim 10, wherein the pair of centering detents are protrusions or raised ridges or ribs.

12. A trim retention assembly for an automotive trim component, comprising:
a molded doghouse having a slot on an end of the molded doghouse and having an aperture transverse to the slot, wherein the aperture has a smooth bore with a predetermined width;
a clip portion having a pair of flexible arms and a neck portion, said neck portion disposed between a base and a larger diameter portion of the clip portion and selectively slid into and retained in the bore, wherein the neck portion is narrower than the width of the bore to provide the neck portion with space to move in either direction transverse to a longitudinal clip load direction of the neck portion into the bore to accommodate any tolerance in the attachment of the trim component;
a pair of centering detents on each flexible arm; and
a self detent feature formed at a terminal end of each flexible arm, each self detent feature being ramped for passing through the slot in the molded doghouse and returning to an outward position to keep the pair of flexible arms within the slot.

13. The trim retention assembly of claim 12, wherein the clip portion does not rotate relative to the molded doghouse once the self detent feature is passed through the slot in the molded doghouse and returns to the outward position.

* * * * *